(12) United States Patent
Bertens

(10) Patent No.: US 8,428,330 B2
(45) Date of Patent: Apr. 23, 2013

(54) METHOD FOR DERIVING AMOUNT OF DENSE TISSUE FROM MAMMOGRAPHIC IMAGE

(75) Inventor: Tom Bertens, Perk (BE)

(73) Assignee: Agfa HealthCare NV, Mortsel (BE)

( * ) Notice: Subject to any disclaimer, the term of this patent is extended or adjusted under 35 U.S.C. 154(b) by 850 days.

(21) Appl. No.: 12/550,678

(22) Filed: Aug. 31, 2009

(65) Prior Publication Data

US 2010/0104151 A1    Apr. 29, 2010

Related U.S. Application Data

(60) Provisional application No. 61/094,133, filed on Sep. 4, 2008.

(30) Foreign Application Priority Data

Sep. 3, 2008  (EP) .................................... 08105220

(51) Int. Cl.
   *G06K 9/00*   (2006.01)
(52) U.S. Cl.
   USPC .......................................... 382/132; 382/128
(58) Field of Classification Search .......... 382/128–132, 382/199, 266
   See application file for complete search history.

(56) References Cited

U.S. PATENT DOCUMENTS

| | | | |
|---|---|---|---|
| 5,400,387 A | | 3/1995 | Gard et al. |
| 5,740,268 A | * | 4/1998 | Nishikawa et al. ............ 382/132 |
| 6,301,378 B1 | * | 10/2001 | Karssemeijer et al. ....... 382/132 |
| 7,315,640 B1 | | 1/2008 | Brady et al. |

FOREIGN PATENT DOCUMENTS

| | | |
|---|---|---|
| WO | 95/14966 A1 | 6/1995 |
| WO | 98/43201 A1 | 10/1998 |

OTHER PUBLICATIONS

Roller, D., "A Method for Interpreting Pixel Grey Levels in Digital Mammography," Image Analysis and Recognition Lecture Notes in Computer Science; LNCS, Springer, Berlin, DE, vol. 4142, Jan. 1, 2006, pp. 580-588.
Van Engeland, S., et al., "Volumetric Breast Density Estimation From Full-field Digital Mammograms," IEEE Transactions on medical Imaging, vol. 25, No. 3, Mar. 2006, pp. 273-282.
European Search Report dated Dec. 5, 2008, from counterpart European Application No. EP 08 10 5220, filed on Sep. 3, 2008.

* cited by examiner

*Primary Examiner* — Luke Gilligan
(74) *Attorney, Agent, or Firm* — Houston & Associates, LLP

(57) ABSTRACT

A region of interest in the image is determined and for each pixel in each location (x,y) in that region of interest a value $h_{int}(x,y)$ is computed representing the amount of dense tissue below said pixel as $$h_{int}(x, y) = \frac{2}{\mu_{fat}(E) - \mu_{int}(E)} (\text{Log}(p(x, y)) - \text{Log}(p_{fat}))$$

wherein p(x,y) represents the pixel value of a pixel at location (x,y) in said digital mammographic image, $p_{fat}$ is a reference fat pixel value, $\mu_{fat}, \mu_{int}$ are the linear attenuation coefficients of fat tissue and dense tissue and E is the mono-energetic energy value of the x-ray source at image recording, whereby E and $p_{fat}$ are derived from said digital mammographic image representation.

16 Claims, 7 Drawing Sheets

FIG. 2 (Background segmentation)

FIG. 3 (Thoracic muscle segmentation)

FIG. 4 (Pfat)

FIG. 5 (pfat)

FIG. 6 (density computation based on SMF representation)

METHOD FOR DERIVING AMOUNT OF DENSE TISSUE FROM MAMMOGRAPHIC IMAGE

RELATED APPLICATIONS

This application claims priority to European Patent Application No. EP 08105220.1, filed on Sep. 3, 2008, and claims the benefit under 35 USC 119(e) of U.S. Provisional Application No. 61/094,133, filed on Sep. 4, 2008, both of which are incorporated herein by reference in their entirety.

BACKGROUND OF THE INVENTION

In mammography it has been established that a causal relationship exists between breast tissue composition and increased risk of cancer.

In an article by R. Highnam et al. entitled 'Breast composition measurements using retrospective standard mammogram form' published in Phys. Med. Biol. 51 (2006) 2695-2713 it has been published that measures of breast tissue composition may serve as biomarkers for breast cancer risk. The composition measure that is most studied is the percentage of dense breast tissue in the breast. Typically the ratio of the area judged to be of dense nature and the area of the whole projected breast is evaluated. This ratio is classified into a number of categories such as the BI-RAD classification (ACR 1998). Another classification system known in literature is the Wolfe system.

When digital mammographic images are generated, the pixel value in a pixel depends on the characteristics of the x-ray image digitizer that is used, on the applied radiation dose at image recording and on the radiation absorption of the breast.

Typically the radiologist is interested in the radiation absorption of the breast and wants to eliminate the other factors.

A so-called SMF representation of an x-ray mammogram is a standardized quantitative representation of the breast from which the volume of non-fat tissue and breast density can be easily estimated.

SUMMARY OF THE INVENTION

Previous theoretical analysis of the SMF suggested that a complete and substantial set of calibration data would be required to generate realistic breast composition measures.

The present invention relates to mammography more particularly to the computational analysis of mammographic images obtained by digital image acquisition techniques such as computed radiography (CR) or direct radiography (DR) systems.

An aspect of the present invention is to provide a method for deriving the amount of dense tissue from a digital mammographic image representation without the need for calibration data of the employed image acquisition system.

The above-mentioned advantageous effects are realized by a method of deriving the amount of dense tissue from a digital mammographic image representation as follows.

(1) determining a region of interest in said image, (2) computing for each pixel in each location (x,y) in said region of interest a value $h_{int}(x,y)$ representing the amount of dense tissue below said pixel as $$h_{int}(x,y) = \frac{2}{\mu_{fat}(E) - \mu_{int}(E)}(\text{Log}(p(x,y)) - \text{Log}(p_{fat}))$$

Here, p(x,y) represents the pixel value of a pixel at location (x,y) in said digital mammographic image, $p_{fat}$ is a reference fat pixel value, $\mu_{fat}, \mu_{int}$ are the linear attenuation coefficients of fat tissue and dense tissue as a function of E and E is the mono-energetic energy value of the x-ray source at image recording, whereby E and $p_{fat}$ are derived from said digital mammographic image representation, and from $h_{int}$ a breast classification value representative of the amount of dense tissue is deduced (124).

A digital mammographic image representation can for example be obtained by means of a computer radiography system (CR system) in which an x-ray breast image is temporarily recorded on a photostimulable phosphor screen. The screen is then scanned by means of laser light of a first, stimulating wavelength and releases image-wise modulated light of a second wavelength. The image-wise modulated light is detected and converted into an electric signal representative of the image information. This electric signal is then digitized.

Alternative systems for generating a digital image representation of a breast may be envisaged such as a direct radiography system (DR).

The method according to the principles of the present invention can be advantageous in that it does not need any information on the image recording conditions or on the acquisition system (no information on set up or calibration) and derivates the necessary data for calculating the amount of dense tissue in a breast from the digital mammographic image itself.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 7:
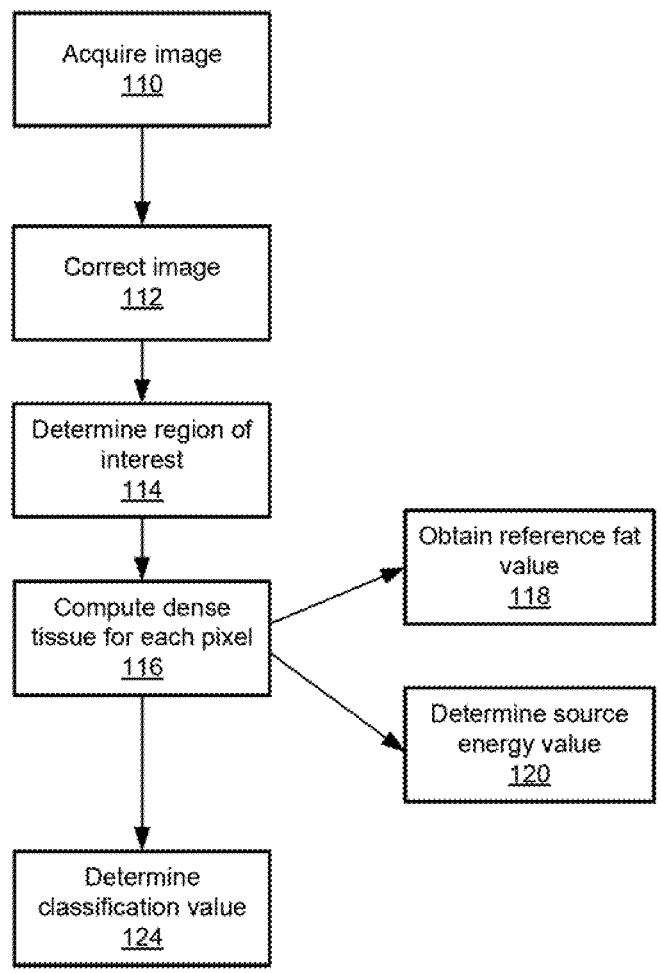
FIG. 7 is a flow diagram showing a method for deriving the amount of dense tissue from a digital mammographic image representation.

FIG. 7 shows a method for deriving the amount of dense tissue from a digital mammographic image representation according to the principles of the present invention.

According to the present invention a digital image representation of an x-ray breast image is first acquired (110). As described higher, this digital image representation can for example be an image obtained by exposing a breast to x-rays and recording the x-ray image on a photostimulable phosphor screen. The exposed screen is then scanned by laser light of the appropriate stimulating wavelength. A stimulated phosphor screen upon stimulation releases image-wise modulated light of a second wavelength. This image-wise modulated light is then collected and converted into an electric signal representation of the image. The electric signal can then be digitized.

Raw image data may be corrected e.g. for the Heel effect (112).

Figure 1:
FIG. 1 is a mammographic image.

A printed image corresponding with such a digital mammographic signal is shown in FIG. 1 for illustrative purposes.

According to the method of the present invention, first a region of interest is determined in the acquired mammographic image (114).

Figure 2:
FIG. 2 illustrates the background segmentation.

The region of interest is in one embodiment obtained by segmentation of the background from the digital image representation by applying known segmentation techniques and by searching the convex part of the skin line and extending it to the borders (see FIG. 2).

Figure 3:
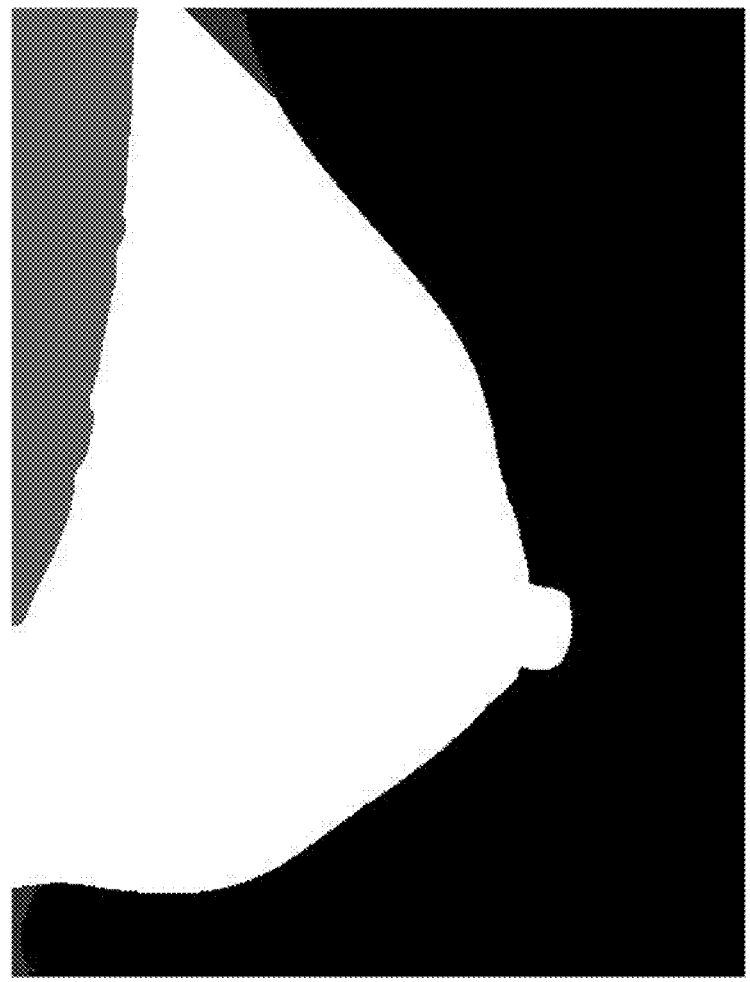
FIG. 3 illustrates thoracic muscle segmentation.
Figure 4:
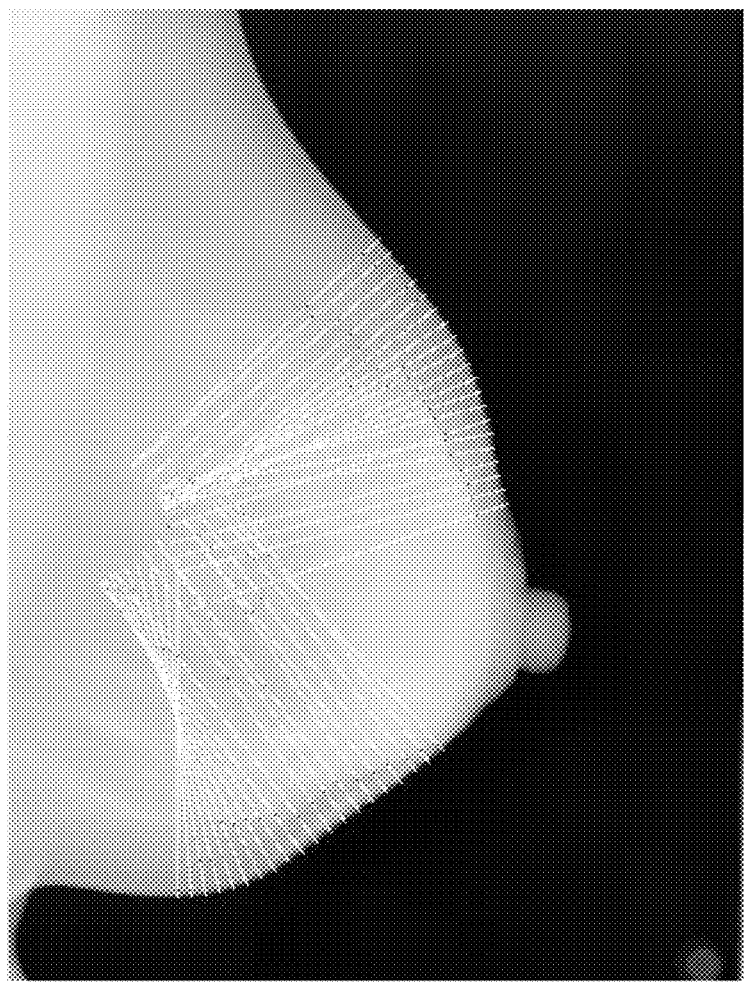
FIG. 4 illustrates how the signal $p_{fat}$ is determined.
Figure 5:
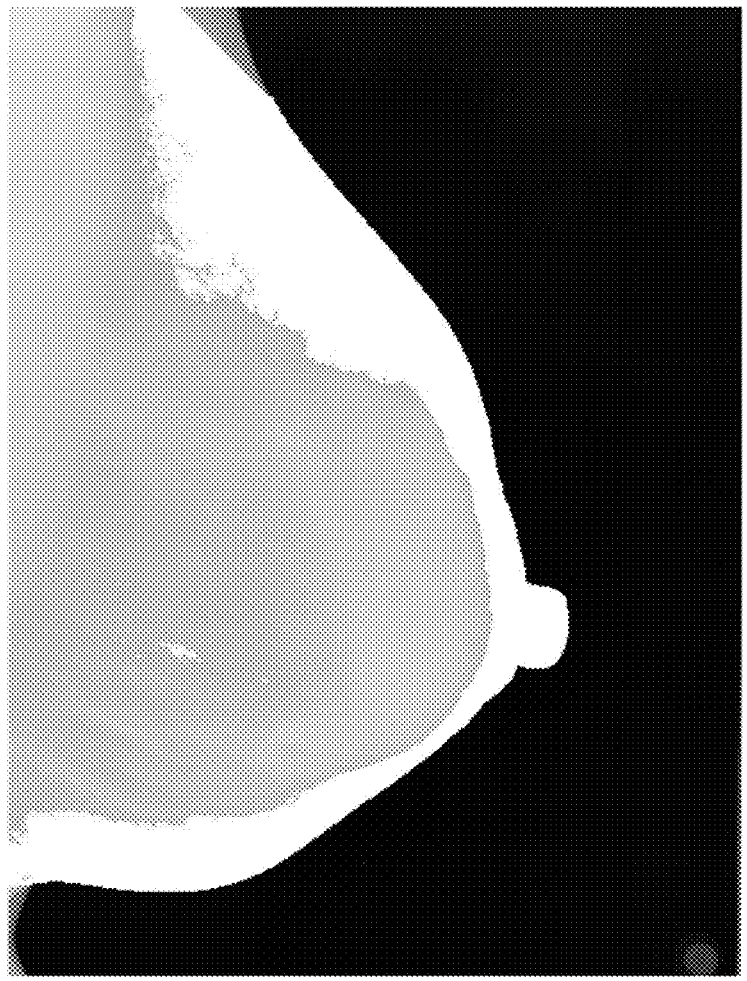
FIG. 5 is a further illustration of the way in which $p_{fat}$ is determined.
Figure 6:
FIG. 6 is an illustration of the breast density computation based on the SMF representation.

In a specific embodiment (specifically in MLO and ML views) the thoracic muscle can also be segmented before starting the search for the convex part of the skin line (FIG. 3).

The standard mammogram form (SMF) is a 2D representation of a mammographic image wherein each pixel represents the amount of underlying tissue in cm.

The standard mammogram form is based on a complex physical model:

$$p(x, y) = f(E_p^{imp}(x, y))$$

$$E_p^{imp}(x, y) = \Phi(V_t, x, y) A_p t_s \int_0^{\varepsilon_{max}} N_0^{rel}(V_t, \varepsilon) \varepsilon S(\varepsilon) G(\varepsilon) e^{-\mu_{luc}(\varepsilon) h_{plate}} e^{-h\mu(\varepsilon)} d\varepsilon$$

$$h\mu(\varepsilon) = h_{int} \mu_{int}(\varepsilon) + h_{fat} \mu_{fat}(\varepsilon)$$

It is the aim to compute $h_{int}$ for each pixel $p(x,y)$ (116). It is possible to perform the following simplifications:

SQRT image: $p(x,y)^2 = a \ast Eimp(x,y) + b$ with offset $b=0$ and to apply a mono-energetic simulation so that $$p(x,y)^2 = a \ast e^{-h_{int}\mu_{int}(E) - h_{fat}\mu_{fat}(E)}$$

$$p(x,y)^2 = a \ast e^{-h_{int}(\mu_{int}(E) - \mu_{fat}(E)) - H\mu_{fat}(E)}$$

For a pixel with only fat tissue at full compression thickness H $$p_{fat}(x,y)^2 = a \ast e^{-H\mu_{fat}(\varepsilon)}$$

If we know a reference fat pixel value $p_{fat}$ $$\frac{p(x, y)^2}{p_{fat}^2} = \frac{e^{-h_{int}(\mu_{int}(E) - \mu_{fat}(E)) - H\mu_{fat}(E)}}{e^{-H\mu_{fat}(E)}} = e^{-h_{int}(\mu_{int}(E) - \mu_{fat}(E))}$$

$$h_{int}(x, y) = \frac{2}{\mu_{fat}(E) - \mu_{int}(E)} (\text{Log}(p(x, y)) - \text{Log}(p_{fat}))$$

The parameters to be determined are then:
$P_{fat}$
Mono-energetic value E $\mu_{fat}(E)$ and $\mu_{int}(E)$—empirical equation by Johns and Yaffe $$\mu(\varepsilon) = \frac{\lambda}{\varepsilon^3} + \mu_S$$

compression thickness H $$H = \frac{2}{\mu_{fat}(E)}(\text{Log}(p_{background}) - \text{Log}(p_{fat}))$$

The following is an explanation of how these parameters to be determined are derived from the image itself The reference fat pixel value $p_{fat}$ can be obtained (118) by analysis of data read out of a number of profiles perpendicular to the skin line of said mammographic image.

More specifically for each of said profiles a first pixel being the darkest pixel of the pixel values of a predetermined innermost part of said profiles (for example innermost ¾ th of profile) is searched for. Then the outermost part of each of the profiles is scanned in the direction of the skin line to find a second pixel which is a darker pixel than said first pixel and in which a strong pixel value variation occurs (e.g by analyzing the n-th order gradient).

Finally $p_{fat}$ is determined by averaging these second pixels. The averaging is preferably a solid median calculation.

First the median is calculated, then the standard deviation of all 'fat' values is calculated with respect to this median, then the values outside the range [median minus 1.75*standard deviation, median plus 1.75*standard deviation] are eliminated and the reference value $p_{fat}$ is calculated as the average of the remaining values.

In a specific embodiment the following steps are performed to determine $p_{fat}$.

First a number of profiles perpendicular to the skin line of the mammographic image are determined.

(1) On a profile the darkest pixel in the inner (situated nearest to the ribs) three quarter part of the profile is searched.

(2) Then the profile is scanned from the ¼ point to the skin line.

(2a) If the first point is already darker than the point determined in step (1), then we are already in a fat part of the breast or the breast is a dense breast without fat tissue. Consequentially it is uncertain that the point determined in step (1) is a reference fat pixel. The uncertainty can be solved e.g. by leaving this point out or by further searching.

(2b) If the first point is not darker than the point determined in step (1) this means that the point detected in step (1) is most likely a point with mainly fat tissue and the current position is a position in which there is dense tissue. In this case a point is searched for where the gradient significantly decreases.

The mono-energetic energy value E of the x-ray source at image recording is also determined from the image itself (120). It is determined as a function of an estimation of the compression thickness $H_{est}$ at image recording.

$H_{est}$ is a multiple of the breast edge width, more particularly in the range of 2 to 2.5 times said breast edge width.

The breast edge width is derived from the $p_{fat}$ value. Given the determined $p_{fat}$ value, each profile is again scanned from the outer side towards the inner breast side until a pixel is found having a pixel value that is lighter than the value $p_{fat}$.

The distance between that pixel and the skin line is measured for each profile and the breast edge width is determined as the median of all the determined distances.

The compression thickness can be computed as the logarithmic ratio of a dose-linear representative background pixel value and a dose-linear reference fat pixel value and wherein said logarithmic ratio is scaled with the inverse of the linear attenuation coefficient of fat tissue.

A breast density percentage can be computed as weighted sum of the values $h_{int}(x,y)$ in the selected region of interest.

Alternatively a transfer function $f$ can be applied to the computed amount of dense tissue $h_{int}$ in each pixel within said region of interest and all the values of $f(h_{int})$ are combined to compute a breast density percentage. Pixels with dense tissue thickness less than a 1 mm may be ignored and pixels between 1 mm and 2 mm may be linearly rescaled to weights between 0 and 1.

The transfer function can be chosen such that a breast density percentage is provided that shows a correlation with known breast density classification schemes such as BI-rads and the Wolfe system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for deriving the amount of dense tissue from a digital mammographic image representation generated by a digital image acquisition system, the method comprising:
    (1) determining a region of interest, which is comprised of pixels, in said digital mammographic image representation from the digital image acquisition system by computational analysis,
    (2) computing for each pixel in said digital mammographic image representation in each location (x,y) in said region of interest a value $h_{int}(x,y)$ representing the amount of dense tissue below said pixel as $$h_{int}(x, y) = \frac{2}{\mu_{fat}(E) - \mu_{int}(E)}(\text{Log}(p(x, y)) - \text{Log}(p_{fat}))$$

wherein p(x,y) represents a pixel value of a pixel at location (x,y) in said digital mammographic image, $p_{fat}$ is a reference fat pixel value, $\mu_{fat},\mu_{int}$ are the linear attenuation coefficients of fat tissue and dense tissue as a function of E and E is the mono-energetic energy value of an x-ray source of the digital image acquisition system at image recording, in which E and $p_{fat}$ are derived from said digital mammographic image representation, and
    (3) from $h_{int}$, deducing a breast classification value representative of the amount of dense tissue is deduced from said digital mammographic image representation from the digital image acquisition system by computational analysis.

2. A method according to claim 1 wherein said region of interest is obtained by performing the following on said digital image representation:
    (1) segmentation of background from said digital mammographic image representation,
    (2) searching of convex part of skin line and extending it to image borders.

3. A method according to claim 2 comprising performing a thoracic muscle segmentation prior to said searching.

4. A method according to claim 1 wherein $p_{fat}$ is obtained by analysis of data read out on a number of profiles perpendicular to the skin line of said mammographic image.

5. A method according to claim 4 comprising the steps of
    (a) for each of said profiles a first pixel being the darkest pixel of the pixel values on an predefined innermost part of said profiles is searched for,
    (b) scanning the outermost part of each of said profiles in the direction of the skin line to find a second pixel which is a darker pixel than said first pixel and in which a strong pixel value variation occurs,
    (c) determine $p_{fat}$ by averaging said second pixels.

6. A method according to claim 5 wherein a strong pixel value variation is detected by analysing the n-th order gradient.

7. A method according to claim 6 wherein $p_{fat}$ is determined as the median of said second pixels.

8. A method according to claim 5 wherein said predefined innermost part is the innermost ¾ part of said profiles.

9. A method according to claim 1 wherein E is determined as a function of an estimation of the compression thickness $H_{est}$ at recording of said mammographic image.

10. A method according to claim 9 wherein $H_{est}$ is a multiple of the breast edge width.

11. A method according to claim 9 wherein said compression thickness is computed as the logarithmic ratio of a dose-linear representative background pixel value and a dose-linear reference fat pixel value and wherein said logarithmic ratio is scaled with the inverse of the linear attenuation coefficient of fat tissue.

12. A method according to claim 10 wherein $H_{est}$ is in the range from 2 to 2.5 times said breast edge width.

13. A method according to claim 1 wherein a breast density percentage is computed as a weighted sum of said values $h_{int}(x,y)$ in said region of interest.

14. A method according to claim 1 wherein a transfer function $f$ is applied to the computed amount of dense tissue $h_{int}$ in each pixel within said region of interest and wherein all the values of $f(h_{int})$ are combined to compute a breast density percentage.

15. A method according to claim 14 wherein pixels with dense tissue thickness less than a 1 mm are ignored and pixels between 1 mm and 2 mm are linearly rescaled to weights between 0 and 1.

16. A method according to claim 1 wherein a transfer function $f$ is applied to the computed amount of dense tissue $h_{int}$ in each pixel within said region of interest such that a breast density percentage is obtained that correlates with known breast density classification systems such as BI-RADS or Wolfe system.

* * * * *